(No Model.)
R. W. HUSS.
FABRIC.
No. 539,224. Patented May 14, 1895.
Fig. 1.
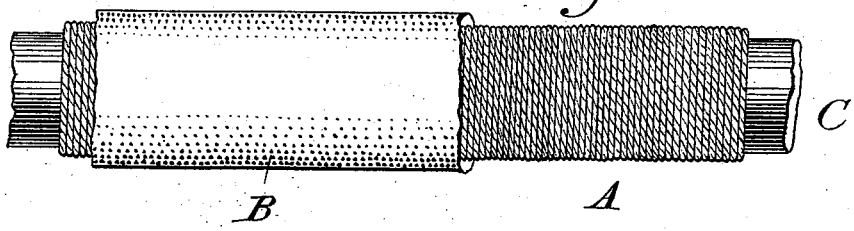
Fig. 2.
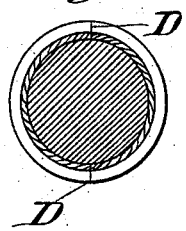
Fig. 3.
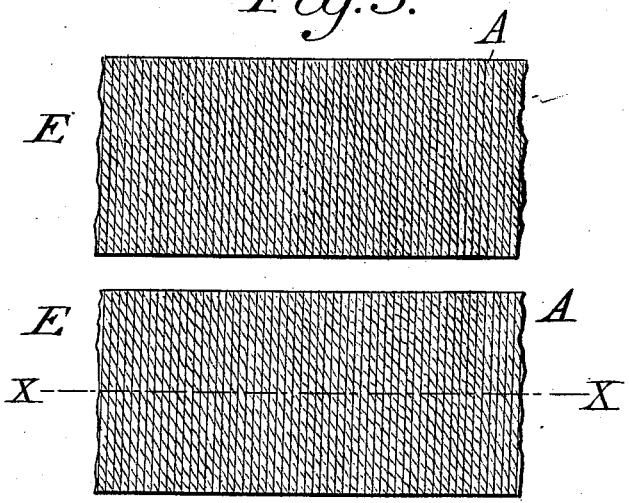
Fig. 4.
Witnesses
Edward Lindsley
Luther G. Hopper
Inventor
Rudolph W. Huss
By his attorney
Wm. A. Skinkle

UNITED STATES PATENT OFFICE.

RUDOLPH W. HUSS, OF CLEVELAND, OHIO, ASSIGNOR TO HENRY A. LOZIER, OF SAME PLACE.

FABRIC.

SPECIFICATION forming part of Letters Patent No. 539,224, dated May 14, 1895.

Application filed October 9, 1893. Serial No. 487,589. (No specimens.)

*To all whom it may concern:*

Be it known that I, RUDOLPH W. HUSS, a citizen of the United States, residing at Cleveland, in the county of Cuyahoga and State of Ohio, have invented a certain new and useful Improvement in Fabrics, of which the following is a specification.

My invention relates to an improvement in fabric made up in part of fibrous or similar flexible threads, and more particularly to such a fabric which employs in its composition rubber or other similar material in its nature impervious to moisture or in its nature elastic, and especially to a fabric of this character composed in part of fibrous or similar flexible threads, and in part of a material in its nature elastic and impervious to moisture and capable of vulcanization.

In the manufacture of rubber cloth as heretofore produced it has been the usual practice, first, to produce a woven fabric made up of threads interwoven and hence crossing each other, which fabric has been saturated with soft rubber gum and subsequently subjected to the act of vulcanization to produce a practically homogeneous material. Sometimes the product has been made by placing a sheet of woven fabric upon a sheet of rubber or between two sheets of rubber or upon both sides of a sheet of rubber and thereupon to vulcanize the parts together. In any method heretofore employed, so far as I am aware however, for producing a rubber fabric, a woven sheet of material has been employed, and it is the object of my invention, primarily, to produce a fabric which shall be made up of flexible threads which are not interwoven but are held together by the rubber or equivalent material employed therewith. Where a material, made up of interwoven threads is used under conditions involving a vibration of its texture, as for instance, where it is employed as a covering for hose, belting, bicycle tubing, washers and such like uses, it is found that the contact of the threads with each other causes a species of sawing or cutting action one against the other which results in the severance of the threads. Such severance minute at first, soon results in the destruction of the fabric and it has been ascertained that where the vibration to which the fabric is subjected is rapid and continuous, as in the case of belting, bicycle tires, &c., the destruction from this cause occurs so soon as materially to reduce the value of the product for this use.

A further object of my invention is to produce a fabric which shall be substantially non-stretching in one direction while it is capable of stretching to a considerable degree in another.

A further object of my invention is to produce a fabric which shall be non-stretching in two directions and capable of stretching in another.

A further object of my invention is to produce a fabric which shall be as light as one made of an interwoven sheet saturated with or laid upon rubber the threads in which shall however be kept out of contact with each other.

To these ends my invention consists in a fabric composed of substantially parallel threads of flexible material substantially out of contact with each other, and held together by an elastic or impervious material, such as rubber, preferably vulcanized. Otherwise expressed my invention consists in a fabric comprising a sheet of rubber or similar material having embedded therein substantially parallel flexible threads substantially out of contact with each other.

In order to produce the within described fabric I may employ any suitable means for laying the thread or threads and for causing the same to be embedded or incorporated within the sheet of rubber or its equivalent, rubber composition. As an example of one of such ways, I have arranged a layer of thread and a layer of rubber upon a large straight rod or mandrel, and embedded and incorporated the thread within the rubber by pressure and vulcanization, and then split longitudinally the large tubular sheet thus formed so as to secure one or two sheets therefrom. By winding said thread about the mandrel the parallel thread portions or ultimate parallel threads can be secured, since the cut or cuts will be made transversely to the thread, and hence each sheet of fabric ultimately produced will consist of rubber having parallel threads substantially out of contact. I do not however, limit myself to such particular method.

In the accompanying drawings, Figure 1 shows a portion of a straight mandrel and illustrates portions of the layers of thread and rubber thereon, said layers being split transversely to the thread. Fig. 2 illustrates the same in end view. Fig. 3 shows a couple of sheets of fabric formed by dividing the sheet shown in preceding figures. Fig. 4 is a section through said sheet with the threads and remaining portion of the sheet somewhat exaggerated in size.

The thread A can be applied to either side of the rubber sheet B, and where applied to the side of the sheet next adjacent to the mandrel C it can be first wrapped about the mandrel, after which the rubber can be applied. The whole can then be subjected to pressure and vulcanization so as to embed and incorporate the thread or threads within the rubber. The sheet then formed can then be split as at D, so as to produce one or more sheets E of fabric having parallel threads substantially out of contact with one another, it being observed that although the threads may touch one another they will be substantially out of contact in the sense that they will not saw one another and that they are united by a flexible sheet in which they are embedded. This sheet of fabric will obviously stretch one way but will not materially stretch the other unless the threads are elastic, as they might be for certain purposes.

What I claim as my invention is—

1. A fabric made of elastic and impervious material, such as rubber, having embedded within the surface, threads, substantially out of contact with each other, substantially as described.

2. A fabric made of elastic and impervious material having embedded and vulcanized therein substantially parallel fibrous threads, substantially as described.

3. A fabric made of vulcanized elastic and impervious material having embedded and vulcanized therein substantially parallel fibrous and non-extensible threads, substantially as described.

Cleveland, Ohio, September 23, 1893.

RUDOLPH W. HUSS.

In presence of—
WM. A. SKINKLE,
SAML. A. HAINES.